Figure 1:
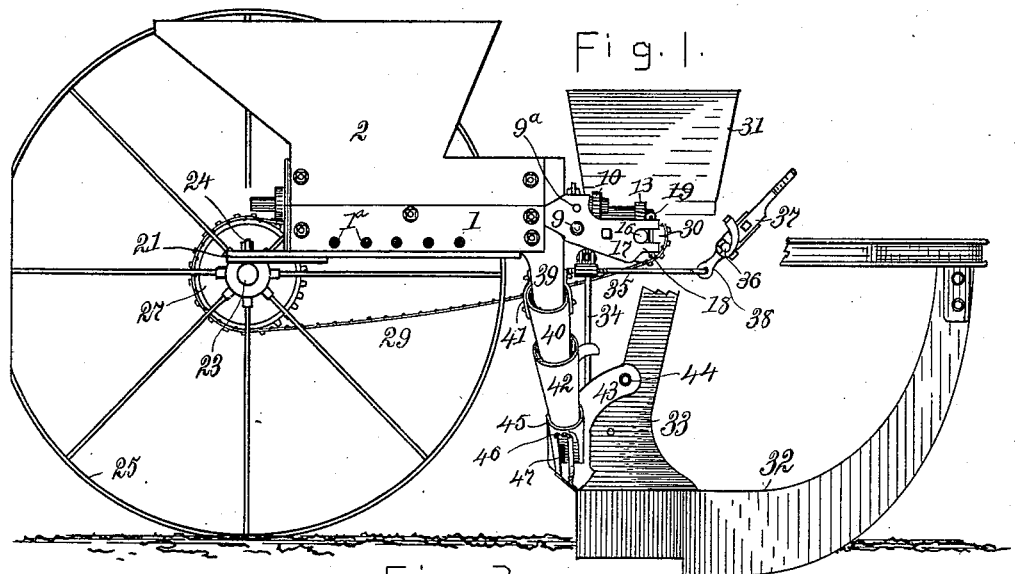

(No Model.)   2 Sheets—Sheet 1.

J. E. BERING.
FERTILIZER DISTRIBUTER.

No. 564,181.   Patented July 21, 1896.

ATTEST
Nora Graham.
William S. Graham

INVENTOR
J. Edw. Bering.
by L. P. Graham
Atty (No Model.) 2 Sheets—Sheet 2.
J. E. BERING.
FERTILIZER DISTRIBUTER.
No. 564,181. Patented July 21, 1896.
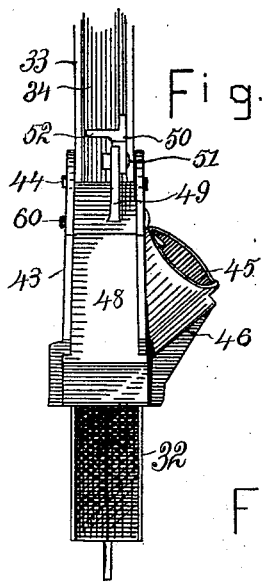
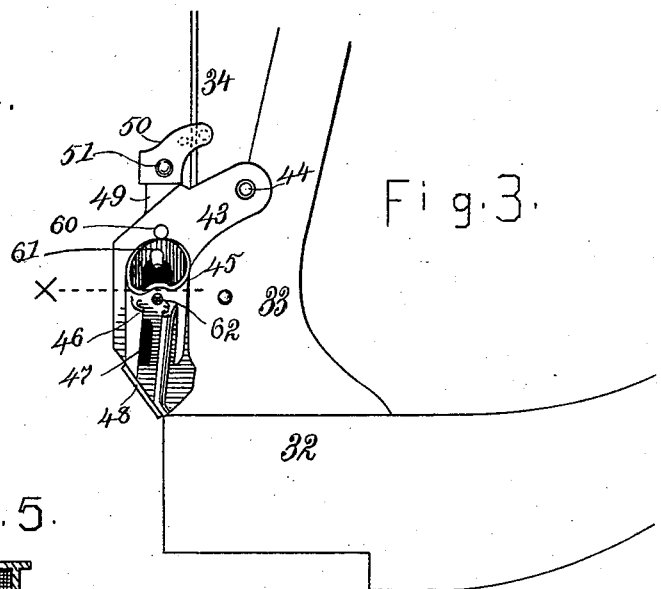
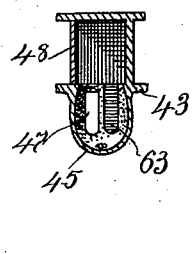
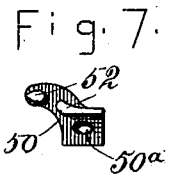
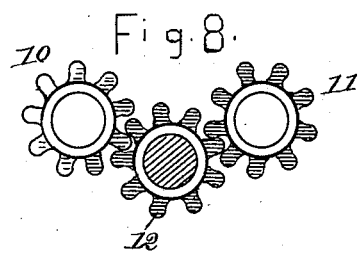
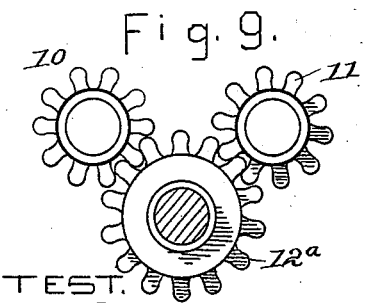
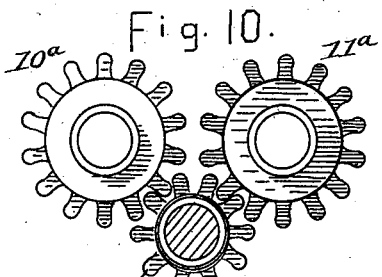
ATTEST.
Nora Graham.
William S. Graham.
INVENTOR
J. Edw. Bering.
by L. P. Graham
Atty

UNITED STATES PATENT OFFICE.

JAMES EDWARD BERING, OF DECATUR, ILLINOIS.

FERTILIZER-DISTRIBUTER.

SPECIFICATION forming part of Letters Patent No. 564,181, dated July 21, 1896.

Application filed December 16, 1895. Serial No. 572,285. (No model.)

*To all whom it may concern:*

Be it known that I, JAMES EDWARD BERING, of Decatur, in the county of Macon and State of Illinois, have invented certain new and useful Improvements in Fertilizer-Distributers, of which the following is a specification.

This invention relates to fertilizer-distributers for planters. It is exemplified in the structure hereinafter described, and it is defined in the appended claims.

Planters are divisible into two well-defined classes, namely, "walking-planters," which require that the operator shall walk, and "riding-planters," which are adapted to carry the operator. A planter of the class last named consists, ordinarily, of a wheel-frame, on which the seat is placed, and a front frame hinged to the wheel-frame and supplied with furrow-openers and seed-dropping mechanism. At the ends of the field, and in traveling from place to place, the frame carrying the planting mechanism is raised by the driver sufficiently far to enable the furrow-openers to clear the ground, and the weight of such frame is then carried wholly, or in great part, by the wheel-frame. To this class belong the corn-planters commonly used in the principal corn-growing States, and it is to such corn-planters that my device as a whole is more particularly applicable.

Fertilizers generally used in distributers placed on planters are of various substances and compounds. They are usually in powder form, but sometimes they closely approach the consistency of a plastic mass. With powders more or less granular there is but little difficulty, as they are easily expelled from the hoppers, but the sticky kinds are very hard to manage.

Heretofore various contrivances have been devised for distributing fertilizers from walking-planters, and in a few instances riding-planters, having the peculiarities hereinbefore specified, have been equipped with fertilizer-hoppers and mechanism for discharging fertilizing substances therefrom. With the first-named case my invention has but little to do, though some of the details of my device may be advantageously used in walking-planters, and in the case of the riding-planters the fertilizer-hoppers have been carried by the front frames, and the discharging mechanism has hardly been adequate to the proper use of the more sticky substances.

One of the principal objects of my invention is to enable the greater part of the weight of the fertilizer-hoppers and contents to be always sustained by the wheel-frame of a two-frame planter, so that there will be less for the driver to lift preparatory to turning around. Another principal object is to provide superior mechanism for compelling the discharge of the fertilizer; and other objects will be apparent from the subjoined description.

Figure 2:
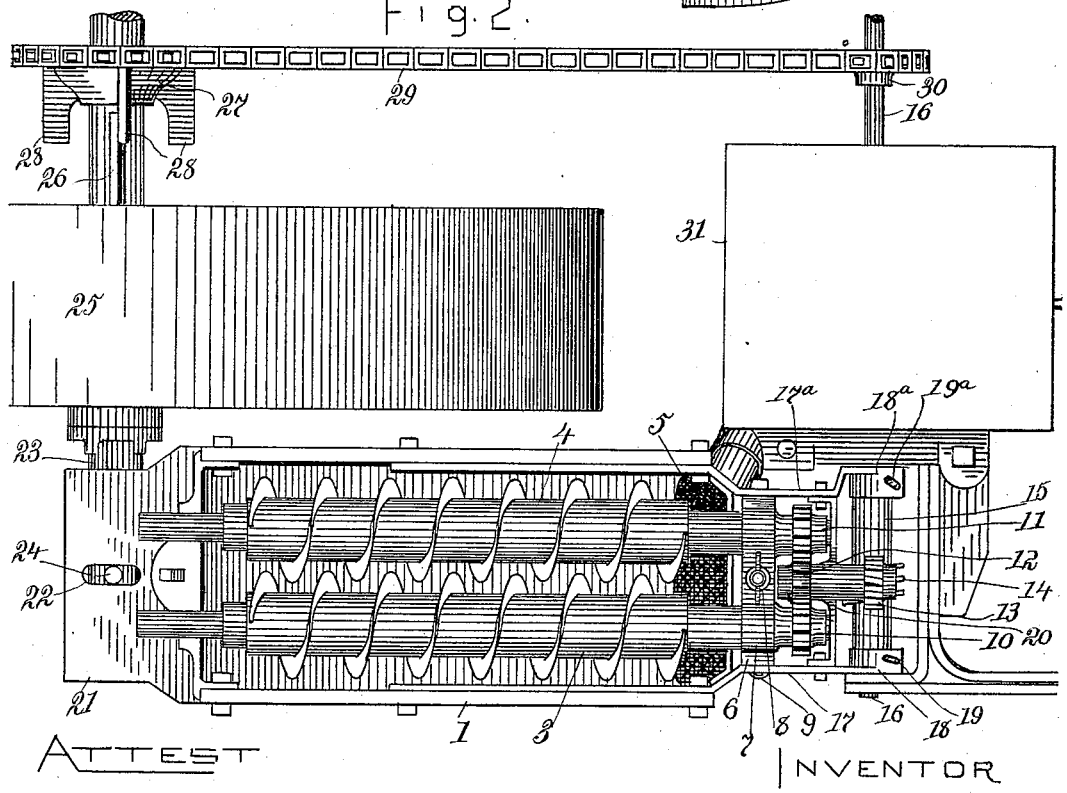

In the drawings forming part of this specification, Figure 1 is a side elevation of a fertilizer-distributer constructed in accordance with my invention, and so much of a corn-planter as is necessary to show the co-relation of the planter and the fertilizer-distributer. Fig. 2 is a plan of the lower part of a fertilizer-hopper, showing the discharging mechanism and the train of gearing between such mechanism and a planter-wheel. Fig. 3 is a side elevation of the lower part of a planter-shank and a second-drop contrivance attached thereto. Fig. 4 is a rear elevation of the parts shown in Fig. 3. Fig. 5 is a section through the second-drop receptacle on line X in Fig. 3. Fig. 6 is a perspective representation of a slide-valve that is used in the second-drop receptacle for a purpose to be hereinafter explained. Fig. 7 is a detail representation of an adjustable block on the upper end of the arm of the valve of the second-drop receptacle. Figs. 8, 9, and 10 are details of gearing, intended to illustrate a manner in which the speed of the discharging mechanism may be varied.

The parts of a corn-planter selected to aid in the explanation of the invention are shown in Figs. 1 and 2, and are designated as follows: The axle-shaft of the rear frame is shown at 23, and one of the carrying-wheels thereon is shown at 25. A seed-hopper is shown at 31, a runner at 32, a shank at 33, a second-drop seed-valve at 34, a check-row shaft at 36, a forked check-row lever at 37, an arm on the check-row shaft at 38, a rod connecting the arm with the second-drop seed-valve at 35, and a first-drop shaft at 16. A sprocket-wheel 27 is journaled on the axle-shaft 23, and it has laterally-extending wings 28, adapted to engage a bar 26 projecting from the wheel. A chain 29 runs over sprocket-wheel 27 and connects the same with sprocket-wheel 30 on first-drop drive-shaft 16.

The details of the planter herein given are merely explanatory and may be modified to any degree consistent with the structural laws of such devices. The rear or wheel frame may be constructed in various ways, as may also the front or planting frame, but for the purposes of this description the axle-shaft 23 may be considered representative of the one and drop-shaft 16 representative of the other. In the special structure shown, the first-drop mechanism of the seed-hopper is actuated by the rotation of the planter-wheel through the intervention of the sprocket-wheels, the chain, the shaft, and other understood gearing; and the second-drop valve is actuated by the knots on a check-row line, through the forked lever, the check-row shaft, the arm, and the connection between the arm and the valve. This arrangement is desirable, but not indispensable.

The fertilizer-hopper comprises the lower part 1 and the upper part 2. The lower part is supplied with holes, as 1ª, near the bottom of one of its sides, and the upper part forms a receptacle for the fertilizing substance. The upper part is made readily removable to give free access to the discharging mechanism. Side plates 17 and 17ª extend forward from the front of the hopper, their forward ends 18 and 18ª are recessed to slip over an extension of shaft 16, and the recessed ends are supplied with pins 19 and 19ª that retain the plates on the shaft in a manner to form a pivotal connection between the hopper and the shaft. The hopper has a rearward-extending tail-plate 21, which is slotted at 22 and is adapted to rest on an extension of the axle-shaft 23. A pin 24 extends upward from the axle-shaft, through the slot of the tail-plate, and holds the rear end of the hopper in position. The pivotal connection of the hopper with the forward frame is approximately in line with the hinge-joint between the forward frame and the rear frame, and the slot in the tail-plate provides for any small lengthwise movement in the hopper that may result from lack of precise coincidence of the two hinges, and that will occur when the front frame of the planter is raised or lowered. The relation of the hopper to the two frames of the planter, whereby the greater part of the weight of the hopper and contents is carried by the rear frame, is largely independent of the particular discharging mechanism employed; and it is a matter of indifference, so far as the principle of this feature of the invention is concerned, with what particular part of the front frame the front of the hopper is hinged and on what part of the rear frame the rear end of the hopper rests.

The mechanism employed to discharge the fertilizer from the hopper consists of a pair (or of any greater number) of shafts having spiral threads or ribs so disposed that those of one shaft occupy spaces between or intermesh with those of the other shaft. One spirally-ribbed shaft is shown at 3 and the other at 4. The rear ends of the shaft journal in the rear end of the hopper and the front ends journal in a box formed of parts 6 and 7, which are secured together by a bolt and nut, as 8. The journal-box for the front ends of the discharge-shafts is held between side plates 17 and 17ª by means of a bolt 9, and provision is made for changing the position of this bolt, in a manner and for a purpose to be hereinafter explained. On the forward end of shaft 3 is fixed a gear-wheel 10, and gear-wheel 11 is fixed on the forward end of shaft 4. Gear-wheel 12 is fixed on a short shaft that journals in sleeve 20, and it meshes with wheels 10 and 11. The sleeve 20 has extensions that are secured to the side plates in a permanent manner. A worm-wheel 13 is fixed on the forward end of the short shaft, and it meshes with a worm 14 on sleeve 15, the sleeve being fixed on shaft 16.

Motion is imparted to the discharge-shafts by the planter-wheel, through the train of gearing described, and the fertilizer substance is forced to the forward end of the hopper by the screw action of the spiral ribs. The lower portion of the hopper is not contracted, the entire width is occupied by the discharge-shafts, and the constant commotion resulting from the motion of the shafts is imparted to the entire under surface of the mass of fertilizer and prevents the fertilizer from becoming packed in the hopper above the shafts. In addition to the ordinary action of a screw-feed, the intermeshing peculiarity of the spiral ribs effectually prevents the fertilizer from becoming packed between the ribs, or, in other words, provides for reciprocal cleaning or clearing action. This result is dependent on the fact that the spirals are similar in direction of extension and in pitch, and the direction of rotation is such that their opposing surfaces move in opposite directions. A portion of each spiral extends across each space between coils of the opposite spiral and, when the device is in operation, exerts scraping action on the material in such spaces.

As the fertilizer is forced to the forward end of the hopper it falls through a discharge-opening 5 into a somewhat loose-jointed chute composed of sections 39, 40, and 42, and is conveyed to the side compartment 45 of the second-drop or distributing receptacle 43. This receptacle is secured to the lower end of the planter-shank and in the rear thereof, a bolt, as 44, being preferably employed for making the connection. It has a valve 48, pivoted on pin 60, and the valve has an upward-extending arm 49, by means of which it is opened and closed. A block 50 is adjustably secured to the upper end of the valve-arm, and it is provided with fingers, as 52, which embrace the second-drop seed-valve 34. The adjustment of the block on the arm is for the purpose of making the closing swing of the second-drop fertilizer-valve precisely conform to the closing swing of the second-drop seed-valve, and it is preferably effected by means of elongated bolt-holes, as 50ª in Fig. 7, in the block or in the arm, or in both.

The under surface of the side compartment 45 of the second-drop receptacle extends obliquely upward. It is divided into an outlet-opening 47 that permits a part of the fertilizer to fall continuously onto the ground alongside the row, and a chute 63 that carries part of the fertilizer into receptacle 43. The outlet-opening has guideways 46 for a slide-valve, and a valve, as 64 in Fig. 6, may be used to close the opening when desired. A pin, as 61, and a pin-hole, as 62, provide means for securing the lower end of the chute to the side compartment, and straps, as 41 in Fig. 1, connect the upper removable section with the downward extension 39 of the hopper.

When the planter is used for planting in check-rows, the fertilizer may be all conveyed to the receptacle 43 and deposited in the rear of the runner simultaneous with the release of the corn by action of the second-drop valve, or the valve 64 may be withdrawn or opened and part of the fertilizer may be dribbled alongside the row, as before explained. When the planter is used for drilling, the valve 48 may be permanently opened and the fertilizer be discharged directly from the hopper, either entirely in the rear of the runner or partly to one side.

In Fig. 8 the gear-wheels illustrated in Figs. 1 and 2 are shown in end elevation, the speed of the shafts under such condition being medium. In order to change the speed, either faster or slower, the bolt 9 in Fig. 1 is raised to hole 9ª, thereby correspondingly raising the front ends of the shafts, and gearing is substituted, as suggested in Figs. 9 and 10. If it is desired to increase the speed of the shafts, a larger wheel 12ª is placed on the short shaft, and if it is desired to decrease the speed, larger wheels 10ª and 11ª are substituted for wheels 10 and 11.

Under adverse circumstances it may happen that the fertilizing compound will become packed beneath the shafts in a manner to interfere with the perfect operation of the device, and to provide for this contingency holes 1ª are formed in a side of the hopper, in order that a stirrer may be inserted and the fertilizer be loosened therewith.

One side only of a planter is referred to in this description, but it is obvious that in a complete planter there would be two fertilizer-distributers, one connected with each planter-runner.

Having thus described my invention, I claim as new and desire to secure by Letters Patent—

1. The combination with a two-frame seed-planter, of a fertilizer-hopper pivotally connected at its front end with a runner-frame, extended rearward beyond the front faces of the planter-wheels, and having a rear support on the wheel-frame.

2. The combination with a two-frame planter, of a fertilizer-hopper connected with the runner-frame, supported on the wheel-frame, and connected slidably with said wheel-frame, substantially as set forth.

3. The combination with a two-frame planter, of a fertilizer-hopper connected at its front end with the runner-frame, and supported slidably at its rear end on an extension of the axle of the wheel-frame, substantially as set forth.

4. The combination with a two-frame planter, of an extension of the axle of the wheel-frame provided with an upward-extended pin, and a fertilizer-hopper having a slotted rear extension, said hopper being connected at its forward end with the runner-frame and having its rear end resting on the axle extension with the pin of the extension engaging the slot of the hopper, substantially as set forth.

5. The combination with a two-frame planter, of a transverse drive-shaft on the runner-frame, a fertilizer-hopper pivotally connected with the shaft and resting on the wheel-frame, and fertilizer-discharging mechanism in the hopper adapted to be actuated from the shaft, substantially as set forth.

6. The combination in a two-frame planter, of an axle-shaft extending beyond the wheels, a transverse shaft for actuating the dropping mechanism of the seed-boxes, such shaft extending beyond the seed-boxes, fertilizer-hoppers pivotally connected with the extensions of the drop-shaft and resting on the extensions of the axle-shaft, and fertilizer-discharging mechanism in the hoppers adapted to be actuated from the drop-shaft, substantially as set forth.

7. The combination, in a two-frame planter, of a wheel-driven transverse shaft for actuating the dropping mechanism of the seed-boxes, a fertilizer-hopper pivotally connected with the shaft and resting on the wheel-frame, and screw-like discharging mechanism in the hopper adapted to be actuated from the shaft, substantially as set forth.

8. Discharge mechanism for fertilizer-distributers consisting of a plurality of similar intermeshing rotary spirals geared to turn in the same direction, substantially as set forth.

9. In a fertilizer-distributer, the combination of a drive-shaft, a plurality of similar intermeshing rotary spirals geared to turn in the same direction, such spirals being placed in a hopper at right angles with the drive-shaft, a gear-wheel on each of the spirals, and an intermediate shaft adapted to receive motion from the drive-shaft and having a gear-wheel in mesh with the gear-wheels of the spirals, substantially as set forth.

10. In a fertilizer-distributer, the combination of a hopper, a pair of spirally-ribbed shafts journaled in a box that is vertically shiftable in the hopper, gear-wheels on the shiftable ends of the shafts, and a third shaft journaled in bearings fixed with relation to the hopper, and having a wheel adapted to mesh with the other gear-wheels, whereby the gearing may be changed to vary speed, substantially as set forth.

11. The combination, with a seed-planter having a vertically oscillatory second-drop valve, of a fertilizer-distributer having a correspondingly oscillatory distributing-valve connected directly with the seed second-drop valve, whereby both valves swing in unison, substantially as set forth.

12. A discharge-chute for a fertilizer-hopper, such chute having a valve adapted to discharge at intervals, and also having a closable dribbling-opening, substantially as set forth.

13. A distributing-receptacle fastened in the rear of a planter-shank and having a side compartment that communicates with the fertilizer-hopper, a valve for the receptacle, and a closable opening in the side compartment, whereby the fertilizer may be discharged behind and to one side of the row, either or both, substantially as set forth.

In testimony whereof I sign my name in the presence of two subscribing witnesses.

JAMES EDWARD BERING.

Attest:
LOWBER BURROWS,
HENRY A. WOOD.